(12) United States Patent
Ervin et al.

(10) Patent No.: US 7,940,661 B2
(45) Date of Patent: May 10, 2011

(54) DYNAMIC LINK AGGREGATION

(75) Inventors: Jimmy Ervin, Raleigh, NC (US);
Sanjeev Rampal, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 507 days.

(21) Appl. No.: 11/809,588

(22) Filed: Jun. 1, 2007

(65) Prior Publication Data
US 2008/0298236 A1    Dec. 4, 2008

(51) Int. Cl.
*G08C 15/00* (2006.01)
(52) U.S. Cl. ............ 370/232; 370/229; 370/230.1; 370/231
(58) Field of Classification Search .......... 370/229, 370/230, 230.1, 231, 232, 233, 235
See application file for complete search history.

(56) References Cited

U.S. PATENT DOCUMENTS

| | | | |
|---|---|---|---|
| 6,553,029 B1 * | 4/2003 | Alexander | 370/389 |
| 7,239,608 B2 * | 7/2007 | Sreejith et al. | 370/230 |
| 7,697,525 B2 * | 4/2010 | Zelig et al. | 370/390 |
| 7,778,275 B2 * | 8/2010 | Mani et al. | 370/468 |
| 2002/0110148 A1 | 8/2002 | Hickman et al. | |
| 2006/0250986 A1 * | 11/2006 | Alharbi et al. | 370/258 |

FOREIGN PATENT DOCUMENTS

WO    WO 02/23813    3/2002

OTHER PUBLICATIONS

"Carrier sense multiple access with collision detection (CSMA/CD) access method and physical layer specifications", IEEE 802.3, Section 43, pp. 285-349, Dec. 9, 2005.

* cited by examiner

*Primary Examiner* — Chi H Pham
*Assistant Examiner* — Weibin Huang
(74) *Attorney, Agent, or Firm* — Cindy Kaplan

(57) ABSTRACT

A method and apparatus for dynamically distributing traffic over links grouped together in a data transmission channel are disclosed. In one embodiment, the method includes receiving data at the network device, distributing the data over a first array, mapping the first array to a second array having entries corresponding to the links, and measuring data traffic. The mapping between the first array and the second array is updated based on traffic measurements to balance traffic load over the links.

20 Claims, 5 Drawing Sheets

_US 7,940,661 B2_

DYNAMIC LINK AGGREGATION

BACKGROUND OF THE INVENTION

The present disclosure relates generally to dynamic link aggregation in a communications network.

Network devices are interconnected by communication links for transmitting data packets through physical ports. In order to provide redundancy or bandwidth, some networks bundle multiple communication links between a pair of network devices. Link Aggregation Control Protocol (LACP) is part of an IEEE specification (802.3ad) that allows several physical ports to be bundled together to form a single logical channel. The logical channel has multiple links that connect the network infrastructure device and the network device.

One example of such link aggregation implementation is EtherChannel. In conventional EtherChannel, load sharing is statically configured. EtherChannel frame distribution is based on an algorithm that selects a port based on addresses and session information. For example, the frame distribution may be based on a source address, destination address, or both source and destination addresses. In statically configured channels, load balancing is achieved by assigning each port an address so that all the physical ports in the port group are used. Frames with the same addresses and session information are always sent to the same port in the channel to prevent out-of-order packet delivery. Static link aggregation does not take into account the size of frames or amount of traffic assigned to each port, or variation in traffic over time, and therefore results in limited load balancing and utilization of the link bandwidth.

BRIEF DESCRIPTION OF THE DRAWINGS

Corresponding reference characters indicate corresponding parts throughout the several views of the drawings.

DESCRIPTION OF EXAMPLE EMBODIMENTS

Overview

A method and apparatus for dynamically distributing traffic over links grouped together in a data transmission channel are disclosed. In one embodiment, the method generally comprises receiving data at the network device, distributing the data over a first array, mapping the first array to a second array having entries corresponding to the links, and measuring data traffic. The mapping between the first array and the second array is updated based on traffic measurements to balance traffic load over the links.

In one embodiment, the apparatus generally comprises a processor configured to apply a function to data contained within packets received at the apparatus, distribute the packets over a first array based on results of the applied function, and map the first array to a second array having entries corresponding to the links. The apparatus further includes a monitor operable to monitor traffic and a controller configured to update a mapping between the first array and the second array based on the monitored traffic to balance traffic load over the links. Memory is provided for storing the mapping between the first array and the second array.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
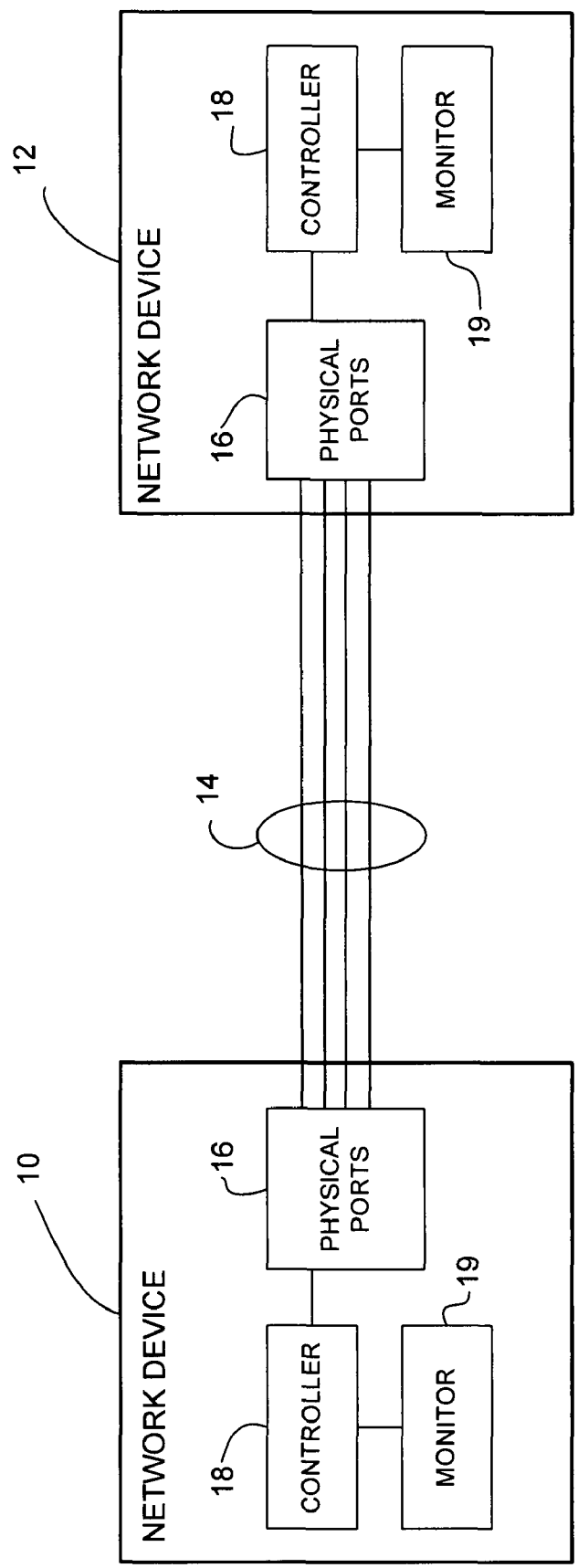
FIG. 1 illustrates an example of a network in which embodiments described herein may be implemented.

Referring now to the drawings, and first to FIG. 1, an example of a network that may implement embodiments described herein is shown. The embodiments operate in the context of a data communication network including multiple network elements. For simplification, only two nodes are shown. The network device may include, for example, a master central processing unit (CPU), interfaces, and a bus. The CPU preferably includes memory and a processor. The network device may be implemented on a general purpose network host machine such as a computer system or network device described below with respect to FIG. 4.

As shown in FIG. 1, the network includes network devices 10 and 12, and links grouped together in a data transmission channel (e.g., EtherChannel or other link aggregation group) 14. The network device may be a switch, router, hub, or other network device. Network devices 10 and 12 are configured to inspect data packets as they are received, determine the source device and destination device of the data packet, and forward the data packet. The source and destination devices can be determined by using the Media Access Control (MAC) address, Internet Protocol (IP) address, port number, etc. EtherChannel 14 is one example of a transmission channel that links the network devices 10, 12 and enables bandwidth aggregation by grouping multiple Ethernet links with the same or different speeds of data transmission into a single logical channel. The EtherChannel 14 includes any number of Ethernet links. Each Ethernet link is connected to a physical port 16 at device 10 and a physical port at link partner 12. Controller 18 groups and allocates the links for each physical port 16 and distributes traffic over the links, as described in detail below. A monitor 19 is provided to measure traffic load at the network device, including measurements for individual links. The method and system described herein for dynamic link aggregation may be implemented on only one network device 10, 12 or both devices.

It is to be understood that the arrangement shown in FIG. 1 and described above is only one example and that the network and network devices may have different configurations than shown and described herein without departing from the scope of the invention.

Embodiments described herein enable efficient traffic load balancing and link bandwidth utilization when using Ethernet link aggregation or similar packet switching schemes. The system provides for dynamic link aggregation by incorporating actual traffic patterns into a link selection algorithm used for link aggregation. The system is configured to operate with link aggregation bundles of all sizes. For example, the system can be used for bundles with unequal link bandwidths without loss of distribution efficiency. In one embodiment, the method and system can be implemented along with IEEE 802.3ad Link Aggregation Control Protocol (LACP), Port Aggregation Control Protocol (PAgP), or other protocols.

Figure 2:
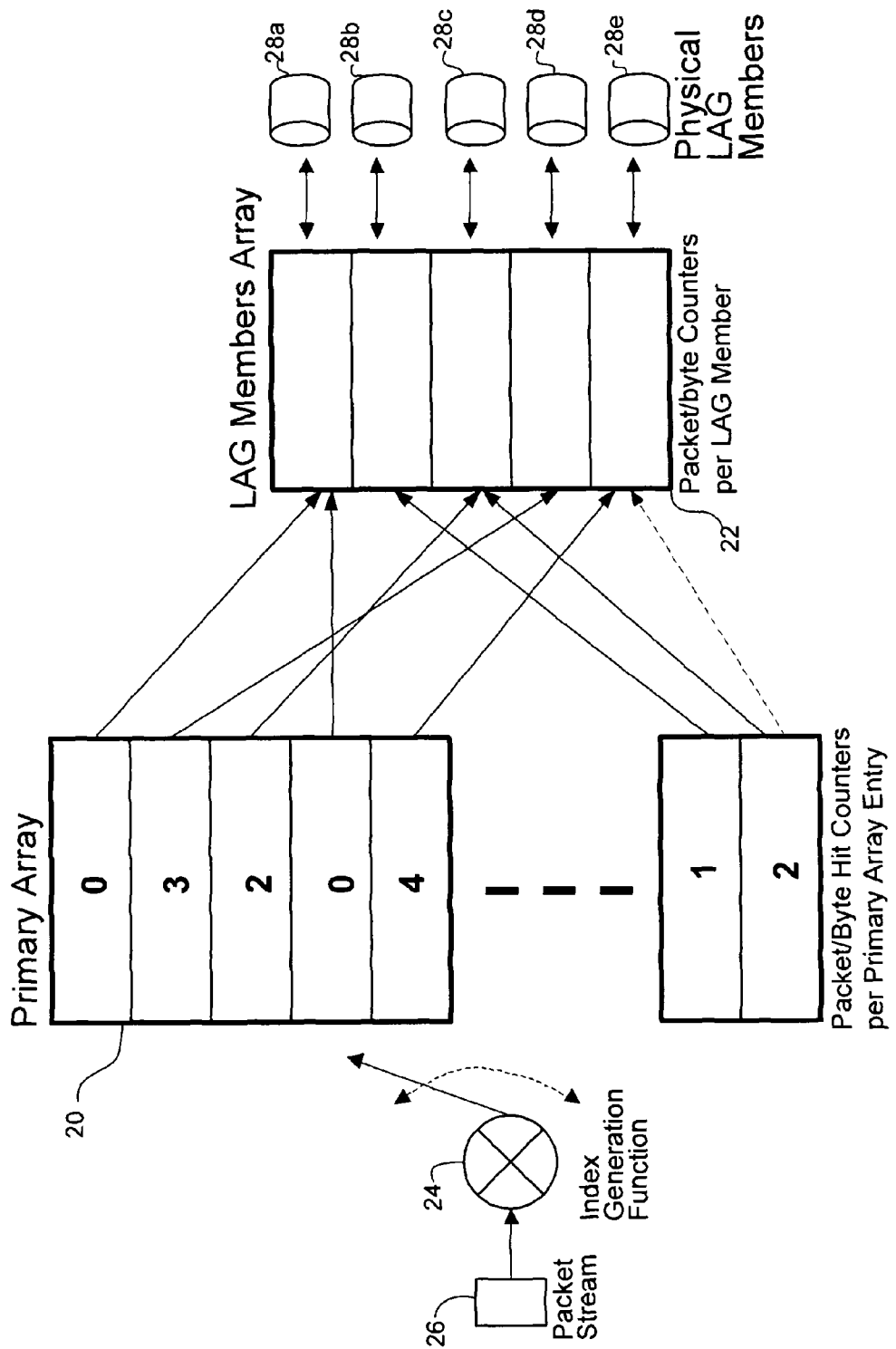
FIG. 2 is a diagram illustrating dynamic link aggregation in accordance with one embodiment.

Referring now to FIG. 2, one embodiment of a system for use in dynamic link aggregation is shown. The system utilizes a two-stage process for distributing traffic over a link aggregation group (LAG). A first primary array 20 maps into a smaller second stage array 22. The second stage array 22 is one-to-one mapped to link aggregation group members (links) 28a, 28b, 28c, 28d, and 28e.

In one embodiment, the system distributes frames based on an algorithm that dynamically updates mapping for array 20 so that actual observed traffic measurements can be used for efficient load distribution. As shown in FIG. 2, an index generation function 24 is applied to packet stream 26. In one embodiment, the index generation function 24 is a hash algorithm that can be used to generate an 8-bit primary hash index. Frames are distributed across the primary array 20 by reducing part of the binary pattern formed from the addresses in the frame to a numerical value that selects one of the entries in the array. The address may be a source address, destination address, or a combination of both. IP addresses, MAC addresses, or TCP/UDP port numbers may be used, for example. In one embodiment, XOR of lowest bits of MAC source address and MAC destination address or a shift register based pseudo-random hash index generator may be used. It is to be understood that the functions described above are only examples and that any suitable type of algorithm may be used to distribute the frames over the primary array 20.

The primary array 20 is preferably large compared to the maximum number of LAG members. For example, the primary array 20 may have 256 entries for link aggregation groups having up to 8 members. A larger primary array 20 provides more granular control on how much traffic to rebalance and move from one LAG member to another. For example, if the hashing rule generates perfectly random distributions then 256 primary hash entries provides an average of 50 entries per LAG member so traffic control granularity could be at the level of 1/50 of a link's bandwidth (2%).

The system dynamically updates the mappings from the primary array 20 to the second stage array 22 based on observed traffic. Traffic measurements may be made at per-physical link level (packet/byte counters per LAG member) or for each entry in the primary array (packet/byte hit counters per primary array entry), or both. One or more metrics may be monitored to determine if mappings need to be updated to redistribute the traffic over the LAG members. In one embodiment, link utilization is monitored for each LAG member. Other metrics may be used in place of link utilization or along with link utilization. For example, packet loss at each LAG member or variation in traffic load between links may be used as a metric. The interval over which traffic is monitored may be, for example, 10 seconds, one hour, one day, or any other desired interval, depending on the network configuration. The measurement interval is preferably configurable by a network operator. The metric or thresholds used to determine if a mapping update is required, may also be configurable by a network operator.

Figure 3A:
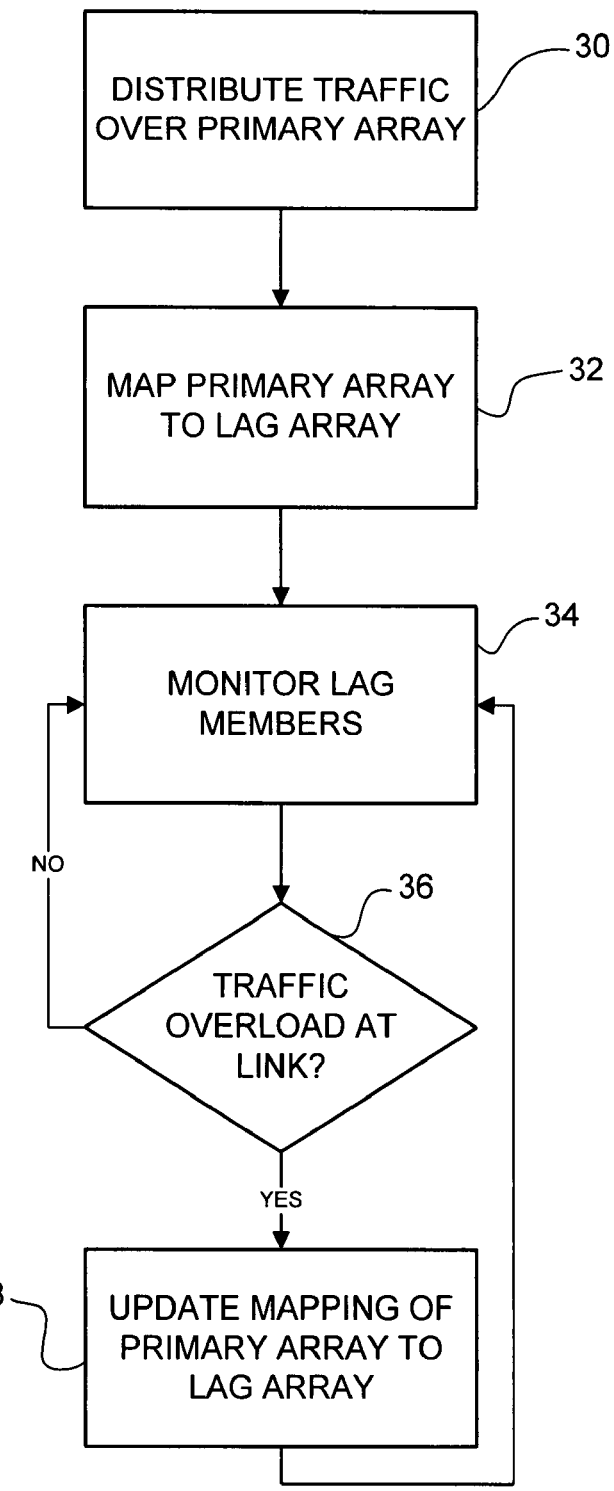
FIG. 3A is a flowchart illustrating an example of a process for dynamic link aggregation.

FIG. 3A is a flowchart illustrating one example of a process for dynamic link aggregation. Data is received at the network device and distributed over the primary array 20 at step 30. The data traffic is uniformly distributed over the primary array 20 using the index generation function 24. Each entry in the primary array 20 is mapped to one of the LAG members in the LAG member array 22 (step 32). In the example shown in FIG. 2, each primary array entry is mapped to one of the LAG members in the five member LAG array 22 (e.g., 0, 1, 2, 3, 4). For the initial distribution, all entries having the same value are preferably mapped to the same LAG member (see solid arrows on FIG. 2). For example, the two entries shown for "0" are mapped to the first LAG member (top member as viewed in FIG. 2) and the two entries shown for "2" are mapped to the third LAG member. The traffic is monitored at step 34. If the measured traffic indicates a traffic overload at one of the links (e.g., one of the measured metrics exceeds a specified threshold for one of the links), the mapping between the first array and second array is updated so that one or more of the primary array entries that point to the overloaded link are changed to point to a lightly loaded link (steps 36 and 38). A subset of the flows is thus reassigned away from the overloaded link, thereby reducing the load on the link. An example of a reassigned entry in the primary array 20 is illustrated by the dashed line in FIG. 2. The bottom entry in the first array 20 was originally mapped to the third LAG member in the second array 22 and is now mapped to the last LAG member.

Since flows change links when primary array entries are remapped, it is possible to have a momentary packet reordering when flows are redirected to another link. However, the packet ordering will quickly be restored and maintained. Once a primary entry has been reassigned, it is preferably placed in a "lock down" state for a period of time to ensure that it does not get reassigned too frequently since each such reassignment can possibly cause a momentary packet reordering within the flows that are reassigned. The system may include a user configurable frequency of potential packet reordering (e.g., reduce frequency by increasing measurement interval or lock down period).

As previously discussed, the system may be configured to measure traffic at each link or for each entry in the primary array 20, or a combination of both. If the system only measures traffic at the physical link level, than the decision as to which primary array entry to reassign to the least loaded link may be random. If the system is configured with packet/byte counters per primary array entry, it may be preferable to reassign the primary array entry which has the minimum amount of traffic in order to rebalance traffic with the smallest disruption to existing flows. If packet/byte hit counters are not used at the primary array 20, the load balancing will be less accurate so the parameters of the algorithm are preferably set more conservatively.

Figure 3B:
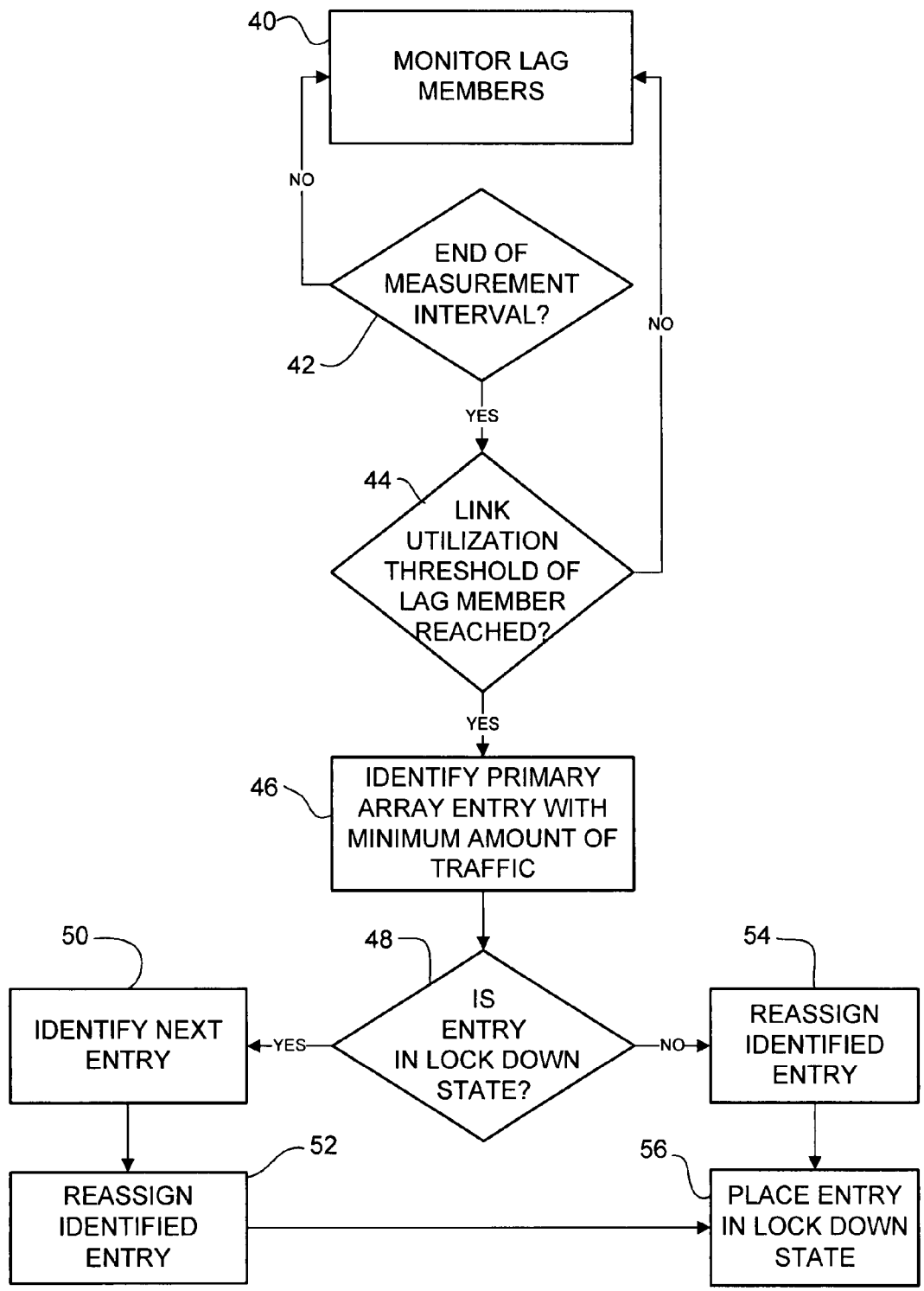
FIG. 3B is a flowchart illustrating details of one embodiment of the process for dynamic link aggregation.

FIG. 3B illustrates details of steps 34-38 of the flowchart of FIG. 3A for one embodiment utilizing packet/byte counters at the primary hash array 20 and a lock down state following reassignment of a hash array entry. Traffic is monitored for a specified interval (steps 40, 42). If a metric (e.g., link utilization) exceeds its threshold the packet/byte counters at the primary hash array 20 are used to identify a hash entry with a minimum amount of traffic (steps 44 and 46). The initial measurement at the LAG array 22 identifies which link has an excessive load and the counters at the primary array 20 are then used to compare the entries that currently point to the overloaded link and determine which of these entries has the least amount of traffic. Before the mapping is changed for this entry, the entry is checked to see if it is in lock down state (step 48). If the entry is in lock down state, an entry pointing to the overloaded link and having the next smallest traffic load is selected and reassigned (steps 50 and 52). If the initial entry in the primary array 20 is not in lock down state, the entry is reassigned (step 54). After the entry has been reassigned it is placed in lock down state for a specified period of time (step 56).

It is to be understood that the processes shown in FIGS. 3A and 3B are only examples and that steps may be added, removed, or changed, without departing from the scope of the invention. Also, the parameters of the algorithm such as update interval, link utilization thresholds, size of primary entry array, lock down interval, etc. can be varied to adapt the scheme to different applications, make it more or less conservative, etc. The processes described above may also be applied to other forms of packet switching, such as IP switching over ECMP routes.

Figure 4:
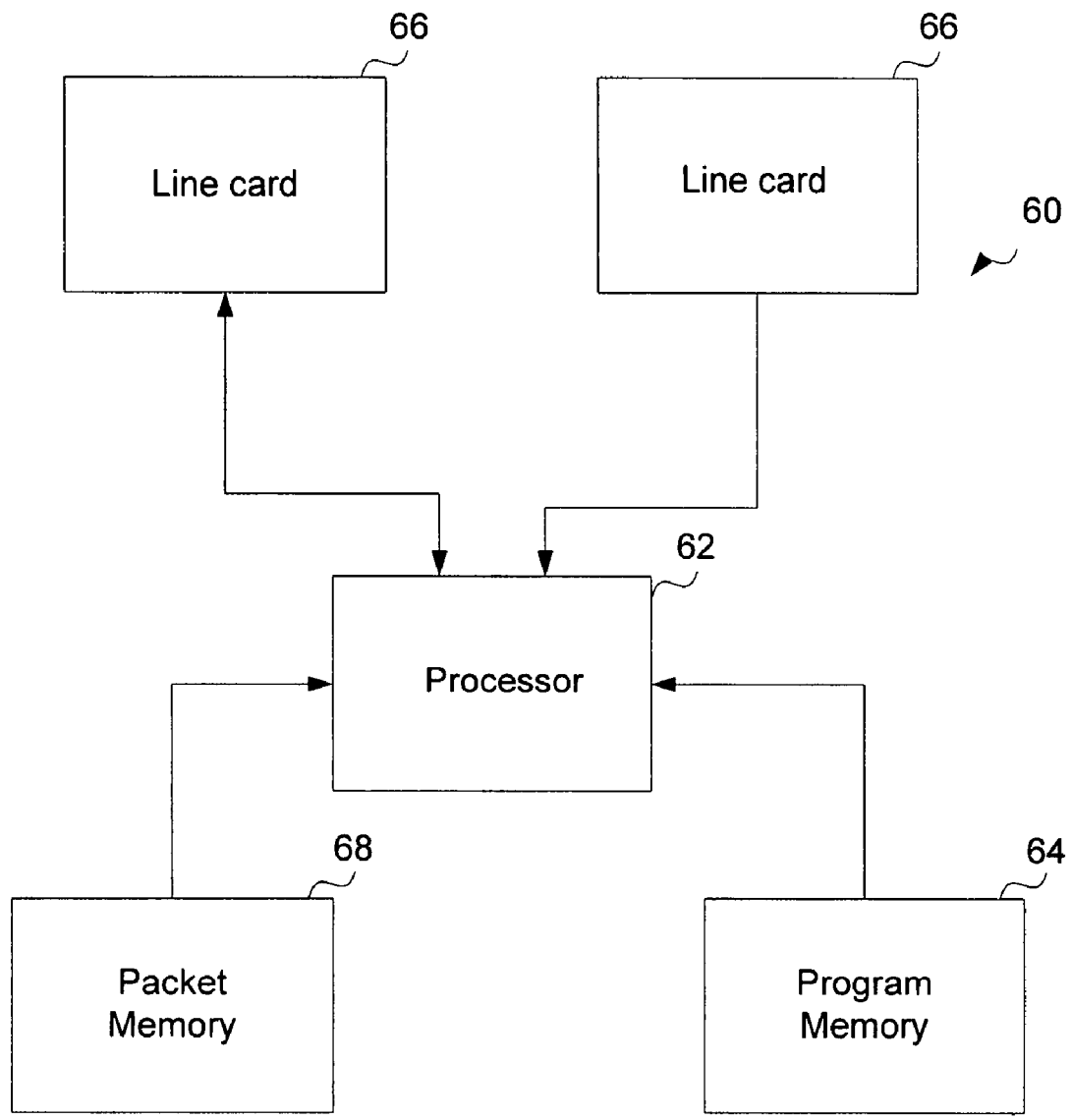
FIG. 4 depicts an example of a network device useful in implementing embodiments described herein.

FIG. 4 depicts a network device 60 that may be used to implement embodiments described herein. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 60 interfaces with physical media via a plurality of line cards 66. Line cards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. To implement functionality according to the system, line cards 66 may incorporate processing and memory resources similar to those discussed above in connection with the network device as a whole.

In one embodiment, the system utilizes a combination of hardware and software. The hardware is used for real time packet/byte counters and the software is used to adjust the mapping (control algorithm).

In one embodiment, the system is implemented on a distributed switch. LAG members may be distributed over multiple independent line cards 66 with independent control CPUs on each line card. The dynamic load balancing rule may be implemented on the central chassis CPU where global state is typically maintained for all members of each LAG across the entire chassis. The individual line card CPUs send periodic updates to the route processor CPU 62 which runs the dynamic load distribution algorithm and sends back the contents of the primary array 20 to each line card 66. This ensures that the load balancing takes into account all traffic being transmitted onto a LAG from all possible sources on the chassis.

The system may also be integrated with EMS (Element Management System)/NMS (Network Management System) based control. If a switch has a programmable management interface then the parameters and primary array contents can be made programmable via external EMS/NMS components as well. This will allow service providers and network administrators to control traffic distribution based on any algorithm of their choice.

As can be observed from the foregoing, the method and system described herein provide many advantages. For example, the method and system provide improved load balancing and link selection based on actual observed traffic rather than static distribution or preconfigured traffic profiles. The system can operate with link bundles of all sizes and mixed bandwidths. Furthermore, the system allows for external EMS/NMS based control of traffic distribution thereby giving service providers more options for traffic engineering and link bandwidth management.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for dynamically distributing traffic over links in a network, the method comprising:
   receiving data at a network device, the network device comprising a plurality of physical ports, each of the physical ports connected to one of the network links, the links grouped together in a data transmission channel;
   distributing the received data over a first array;
   mapping said first array to a second array comprising a plurality of entries, each of said entries corresponding to one of the network links;
   distributing the data from said first array to the second array, wherein distributing comprises assigning the data to the entries at said second array according to said mapping;
   measuring data traffic;
   updating at the network device, said mapping between said first array and said second array based on the measured data traffic to balance traffic load over the network links; and
   transmitting the data from said second array over the network links, the network links selected based on the entries in the second array associated with the data.

2. The method of claim 1 wherein distributing the data over said first array comprises utilizing a hash function.

3. The method of claim 1 wherein said first array is larger than said second array.

4. The method of claim 3 wherein said first array comprises at least 256 entries.

5. The method of claim 1 wherein said second array has a one-to-one correspondence with the links in the data transmission channel.

6. The method of claim 1 wherein measuring data traffic comprises measuring link utilization.

7. The method of claim 6 wherein updating said mapping comprises updating said mapping if said link utilization at one of the links exceeds a specified threshold.

8. The method of claim 1 wherein measuring data traffic comprises measuring data traffic at each entry in said first array.

9. The method of claim 8 wherein updating said mapping comprises selecting an entry in said first array with a minimum traffic load and changing said mapping of the selected entry.

10. The method of claim 1 wherein updating said mapping comprises changing said mapping from at least one entry in said first array to an entry in said second array corresponding to a lightly loaded link.

11. The method of claim 1 further comprising restricting mapping update of an entry of said first array for a specified period of time following an update to the mapping at said entry.

12. The method of claim 1 wherein said updating is performed at specified intervals.

13. The method of claim 1 wherein measuring data traffic comprises utilizing packet/byte counters for each of the links.

14. The method of claim 1 wherein the links comprise Ethernet links and the data transmission channel comprises an EtherChannel.

15. An apparatus for dynamically distributing traffic over links in a network, the apparatus comprising:

a plurality of physical ports, each of the physical ports configured for connection to one of the network links, the links grouped together in a data transmission channel;

a processor configured to apply a function to data contained within packets received at the apparatus, distribute the packets over a first array based on results of the applied function, map said first array to a second array comprising a plurality of entries, each entry corresponding to one of the network links, and distribute the data from said first array to the second array, wherein distributing comprises assigning the data to the entries at said second array according to said mapping;

a monitor operable to monitor traffic;

a controller configured to update a mapping between said first array and second array based on the monitored traffic to balance traffic load over the network links;

a transmitter for transmitting the data from said second array over the network links, the network links selected based on the entries in the second array associated with the data; and memory for storing said mapping between said first array and said second array.

16. The apparatus of claim 15 wherein said first array is larger than said second array and said second array has a one-to-one correspondence with the links in the data transmission channel.

17. The apparatus of claim 15 wherein the monitor is configured to measure traffic at each entry in said first array.

18. The apparatus of claim 15 wherein the processor is configured to update said mapping upon receiving information from the monitor identifying one of the links exceeding a specified link utilization threshold.

19. The apparatus of claim 15 wherein the function is a hash function.

20. An apparatus for dynamically distributing traffic over links in a network, the system comprising:

means for receiving data at the apparatus, the apparatus comprising a plurality of physical ports, each of the physical ports connected to one of the network links, the links grouped together in a data transmission channel;

means for distributing the received data over a first array;

means for mapping said first array to a second array comprising a plurality of entries, each of said entries corresponding to one of the network links;

means for distributing the data from said first array to the second array, wherein means for distributing comprises means for assigning the data to the entries at said second array according to said mapping;

means for measuring data traffic;

means for updating said mapping between said first array and said second array based on the measured data traffic to balance traffic load over the network links; and means for transmitting the data from said second array over the network links, the network links selected based on the entries in the second array associated with the data.

* * * * *